Dec. 20, 1960     E. M. BRIGHT     2,965,529
DIVING BOARD
Filed May 9, 1956     2 Sheets-Sheet 1
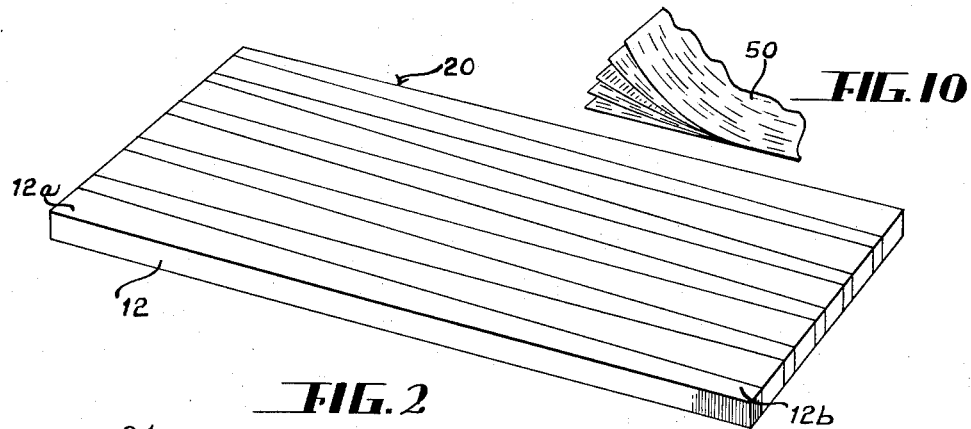
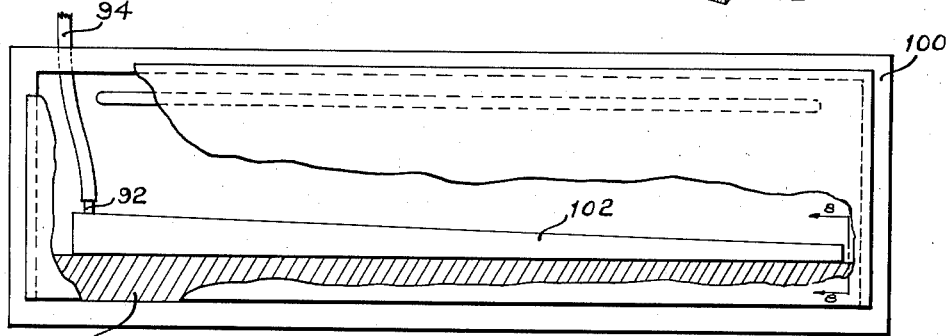
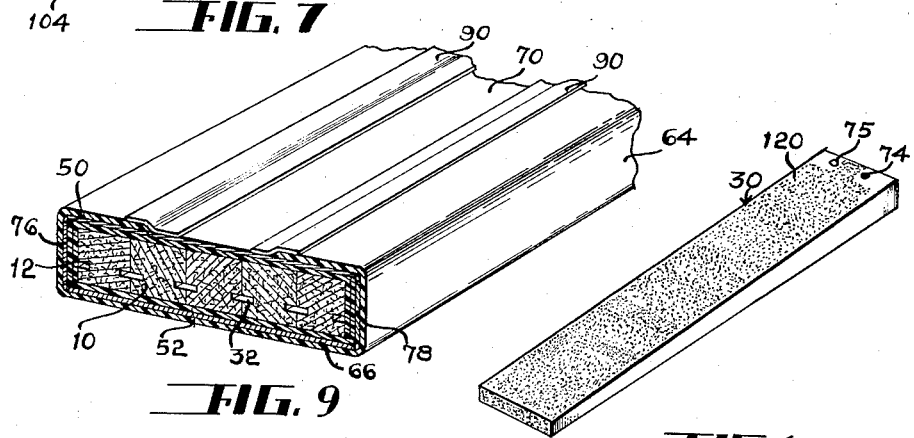
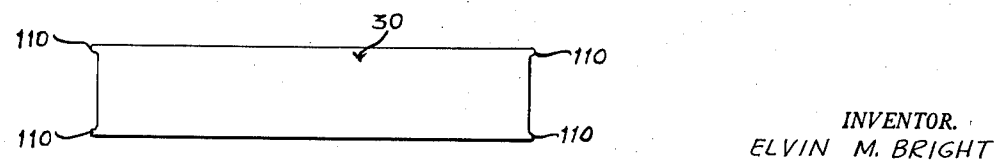
INVENTOR.
ELVIN M. BRIGHT
BY
HIS ATTORNEYS Dec. 20, 1960                E. M. BRIGHT                2,965,529
                              DIVING BOARD
Filed May 9, 1956                                    2 Sheets-Sheet 2
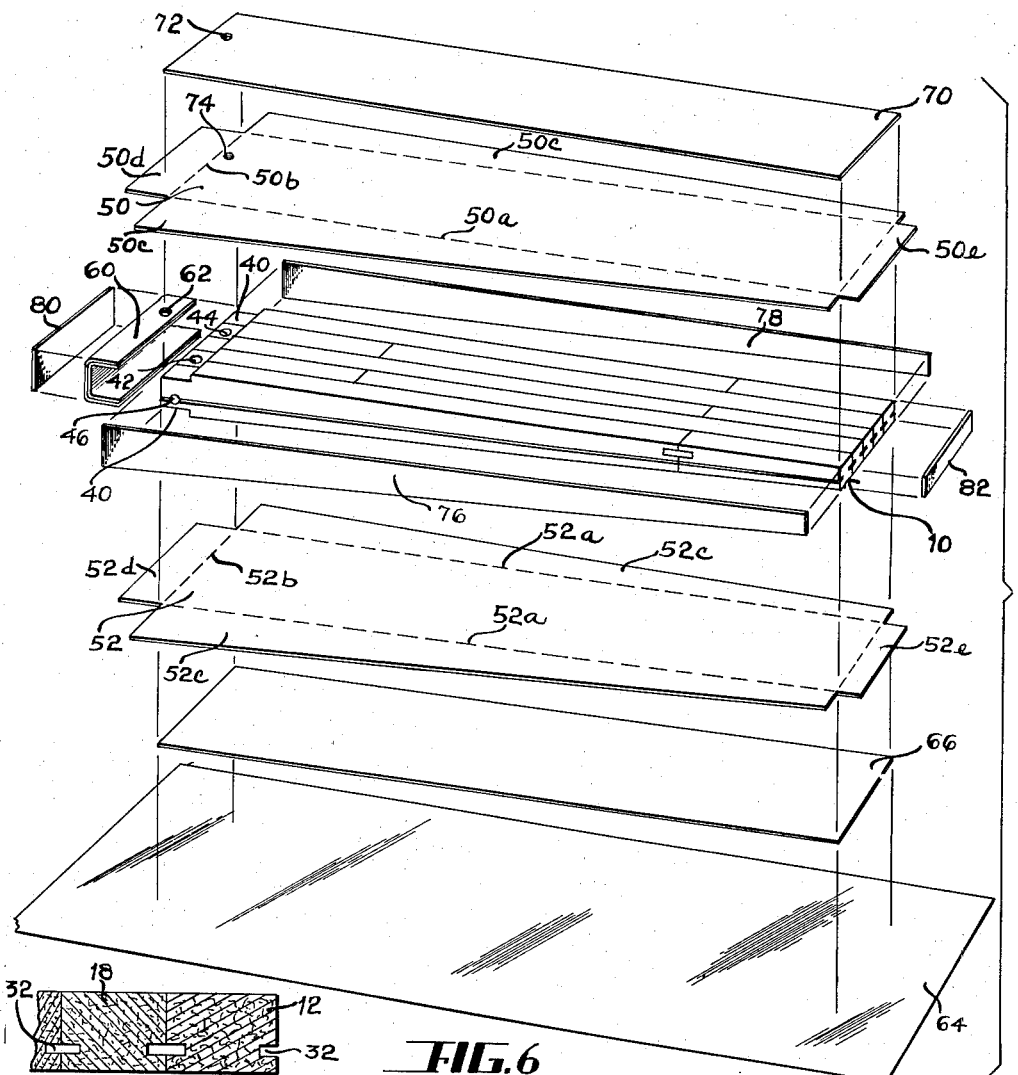
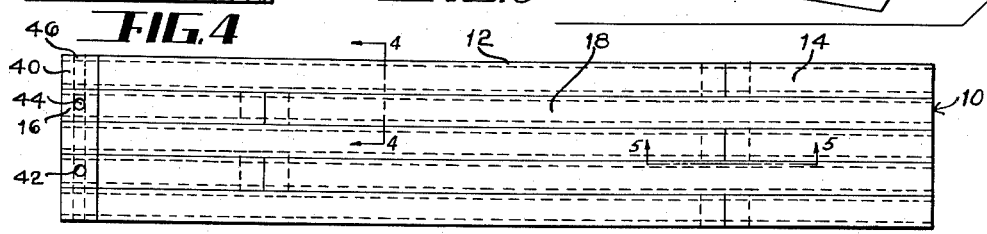
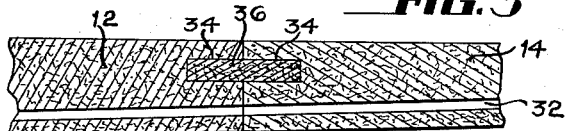
INVENTOR.
ELVIN M. BRIGHT
BY
HIS ATTORNEYS

United States Patent Office 2,965,529
Patented Dec. 20, 1960

2,965,529
DIVING BOARD

Elvin M. Bright, 7238 Atoll Ave.,
North Hollywood, Calif.

Filed May 9, 1956, Ser. No. 583,738

9 Claims. (Cl. 154—110)

This invention relates to a yieldable slab or board that may be used for a diving board, although not necessarily so limited.

Numerous attempts have been made to produce a diving board that is an improvement upon conventional plank diving boards. Some of these have been made of metal, such as aluminum, and others have been made of synthetic materials.

An object of this invention is to provide an improved diving board utilizing glass fibers embedded in plastic encasing a fibrous material filler.

Another object of this invention is to provide a diving board wherein the core is made from bagasse fibers and cellulose formed into a board, generally sold under the trade name "Celotex," the board being severed into strips or spars the strips being oriented through 90° when assembled, whereby the fibers are arranged in layers or strata normal to the surface of the finished board.

Another object of this invention is to provide a binder for the bagasse composition used as a filler for the diving board, the binder consisting of silicate of soda and having a tensile elongation comparing to that of fiber glass.

Another object of this invention is to superimpose laminations upon a fibrous core, each lamination consisting of either longitudinally or transversely disposed glass fibers embedded in a polymerizable plastic material, so that as the covered board is heat treated under pressure, polymerization takes place in the plastic material, so that the finished product, when properly cured, forms a compact composite diving board having great resiliency and strength, always returning to the original shape after use.

Another object of this invention is to provide a method of subjecting a fibrous material coated with laminations of plastic sheets to a vacuum, so as to permit the atmospheric pressure to exert a pressure during the curing operation of the plastic material, the air being exhausted from the interior of the assembly by means of a plurality of channels extending transversely and longitudinally throughout the length of the core member of the board.

Other objects and advantages reside in the construction of parts, the combination thereof and the mode of operation, as will become more apparent from the following description.

In the drawings:

Figure 1 is a finished diving board shown on a much smaller scale than the other figures.

Figure 2 is a sheet of fibrous material that has been cut into tapering strips or spars.

Figure 3 discloses the core of a diving board made up from strips like those shown in Figure 2.

Figure 4 is a fragmentary, cross sectional view, taken substantially on the line 4—4 of Figure 3.

Figure 5 is another fragmentary, cross sectional view, taken substantially on the line 5—5 of Figure 3.

Figure 6 is an exploded view of the parts going into the production of the finished diving board, together with pieces of metal used in forming a mold and a sheet of pliable material used in forming a bag.

Figure 7 discloses a diving board in a mold assembly mounted in an oven used in curing the diving boards.

Figure 8 is an enlarged end view of the molded board after it is removed from the mold, but before the flashes have been removed.

Figure 9 is a cross sectional view of the diving board mounted in the mold and in the sack used in supplying atmospheric pressure to the diving board during the curing operation.

Figure 10 is a fragmentary view of the laminations.

In the manufacture of the diving board a sheet of "Celotex" which may be 4" thick, is severed into tapering strips, the strips being oriented through 90° and cemented together, so that if a diving board 20" wide is desired, five strips of bagasse sold under the trade name "Celotex" 4" wide are laid side by side, the strips tapering from the anchored end of the diving board to the opposite end. In the event the diving board is longer than the length of the "Celotex" board, the strips at alternate ends are spliced near one end and the remaining strips are spliced near the opposite end.

The entire assembly, after being ground down to a uniform surface on one side, is covered by plastic laminations, some of which are longitudinally extending and others transversely extending, each lamination consisting of a plurality of longitudinally extending glass fibers that have been tensioned and embedded in the plastic. After the core has been finished, the laminations are placed both on the top and the bottom, part of the top layer and the bottom layer being folded on the sides and the ends of the board, then the assembly (that is, the core together with the layers) is mounted in a metal mold and encased in a bag or sack from which air is withdrawn so as to create a vacuum, the atmospheric pressure exerting pressure against the top and bottom, the sides and the ends of the assembly while the plastic is being cured. After the plastic has been cured, the assembly is removed from the curing oven, the flashes ground off and the holes drilled for securing it in position, at which time it is ready to be installed.

Due to the elasticity of the glass fibers and the flexibility of the core, this diving board is found to have a much greater elasticity than boards used in the past. After each use, the board returns to its original position.

Referring to the drawings, the reference character 10 indicates the core of the diving board. This core is made up of a plurality of strips or spars 12, 14, 16, and 18. The spars are obtained from a slab or board 20 made of bagasse, generally known in the trade as "Celotex." A "Celotex" board made from bagasse has grains substantially parallel to the top surface of the board, as shown in Figure 2. There are seams between layers of bagasse, the bagasse in each layer being sort of helter-skelter, so that the layers and seams are not well defined. However, in the finished board it has the characteristic of being grained parallel to the top surface of the board. It has been found that a board has greater strength in directions parallel to the grain than in directions transverse to the grain. That being the case, the board 20 is cut into the strips, as shown in Figure 2. For example, the board that has been used in the manufacture of the core of the diving board is 4" thick, 12' long and 4' wide.

Furthermore, as clearly seen in Figure 1 showing the finished board 30, the board tapers from one end to the other. The board is used as a cantilever. As is well known to those skilled in the art, a cantilever having uniform strength, tapers from the end that is supported to the free end. That being the case, the spars 12 have a wide end 12a and a narrow end 12b. By this arrangement, it is possible to utilize the material in a board without any waste excepting the material removed by the saw or cutter.

In the event a diving board is manufactured that has a length greater than the original "Celotex" board, it is necessary to splice these spars, as is clearly shown in Figures 3, 4, and 5. The spars are spliced only in the event the length of the diving board is greater than the maximum length of the "Celotex" board. However, before assembling these spars into a board, both sides of the strips are provided with saw-cut grooves 32 that may be 1/8" thick and 1/4" deep. These grooves are preferably cut nearer one margin so as to be located off center. The grooves of the several spars are aligned, as clearly shown in Figures 4 and 9. In splicing, a spar is provided with a transverse groove 35 registering with the transverse groove 34 of the abutting end. This groove 34 may be 3/4" thick and about three inches deep. None of the dimensions set forth herein are critical.

A tenon-like member 36 is inserted into the notches or grooves 34, as clearly shown in Figure 5. Polyester resin having a catalyst therein is used to cement together the ends of the spars and to cement the tenon-like member 36 into the grooves 34.

These spars or strips are turned over on edge and laid side by side, as clearly shown in Figure 3. The strips are cemented together with a liquid consisting of a polyester resin having a catalyst therein. By using a proper catalyst, the polyester resin sets quite rapidly at room temperature. For example, a board approximately 20" wide requires five strips or spars laid side by side, as shown in Figure 3, each spar being 4" wide, 3" thick at the thick end, and 2" thick at the narrow end. Stiffeners are placed on the outsides of the spars so as to align the sides of the spars. Clamps are applied to the stiffeners so as to clamp the spars against each other.

For a board 16' long, ten clamps may be used. After the board has been clamped and permanently cemented together, the top surface is smoothened by a grinding operation or in any other suitable manner, so as to present a perfectly smooth top surface. The underside does not require finishing. In the first place, the underside need not be as smooth as the top surface and, furthermore, the underside has been finished by placing the spars or strips on a flat table.

The spars forming the board shown in Figure 3 are provided with notches 40, as best seen in the exploded view shown in Figure 6. Two holes 42 and 44 are drilled transversely in the notched portion of the board. A hole 46 is drilled across the board, the hole 46 passing through the holes 42 and 44 and passing through each of the saw-cut grooves 32. This is to provide passages extending between each of the spars from one end to the other, these long extending passages intersecting the transverse passage 46 which passage, in turn, intersects the two holes 42 and 44. The holes 42 and 44 are coated with a plastic binding material. Brass bushings are inserted into the holes and cemented thereto by the plastic binding material that has soaked into the "Celotex" surrounding the hole so as to provide a rigid and firm support for the brass bushings.

The exposed surface of the board is coated with sodium silicate. This sodium silicate has been diluted with water equal to twice the volume of the solids. The water is evaporated out of the assembly by submitting the board coated with sodium silicate to a temperature of 180° for several hours. By diluting the sodium silicate, it is possible to get greater porosity after the water has been driven out. The diluted sodium silicate penetrates the surface of the spars or the core for imparting a high modulus of glass to the fibrous material.

The "Celotex" core is then coated with a liquid of polyester resin which may contain the following ingredients:

| | Percent |
|---|---|
| Phthalic anhydride | 50 |
| Ethylene glycol | 25 |
| Styrene monomer | 25 |

This polyester resin with a catalyst therein is applied to the top surface, to the sides, to the under surface, to the ends, and to the notches by a spatula or a similar instrument. The core is now ready to be enclosed in a laminated casing or protective cover which will now be described.

The material that is used in covering the core is a laminated plastic material having embedded therein a large number of glass fiber filaments. For a 16' board, the cover may consist of five laminae, as clearly shown in Figure 10, the two outer and the two inner laminae having glass fibers extending longitudinally along the length of the board. The center lamina, positioned between the two outer and the two inner laminations, has the glass fibers arranged transversely. These laminae utilized in making the laminated cover for the structure of the core may be made by the method disclosed in my copending application Serial No. 493,948, filed March 14, 1955, now abandoned, for Plastic Material and Process of Producing Same. As described in the above identified application, the glass fiber filaments are coated with a plastic material that adheres to the glass fibers, the glass fibers being placed under tension while being coated, so as to have all of the glass fiber elements arranged parallel to each other. The voids between the coated filaments are filled with another type of plastic, the two plastics being partially polymerized. The laminae are superimposed on top of each other so as to form a unitary laminated sheet.

Two laminated sheets, or cover members, 50 and 52 are used, as can be clearly seen by referring to Figure 6. Each of the sheets 50 and 52 is larger than the top and bottom area of the core member 10. The size of the core member 10 is the same as the area bounded by the score lines 50a and 50b of member 50 and 52a and 52b of member 52. The width of the longitudinal areas 50c extending beyond the score lines 50a is substantially equal to the thickness of the core member 10. The widths of the end portions 50d and 50e are substantially equal to the cross sectional area of the ends of the core member 10. Also, the width of the longitudinal strips 52c extending beyond the score lines 52a are substantially equal to the thickness of the core member 10. Likewise, the widths of the portions 52d and 52e are substantially equal in areas to the areas of the ends of the core member 10. However, before the covers 50 and 52 are applied to the core member 10, a laminated substantially U-shaped member 60 is positioned upon the notches 40 found on the thick end of the core member 10. The thickness of the U-shaped member 60 is substantially equal to the depth of the notches, so that when the U-shaped member 60 is placed in position, it fills the notches.

This U-shaped member is also made from laminated material which may be the same type of material as used in the cover members 50 and 52. The number of laminae in member 60 is sufficient to obtain the desired thickness. Some of the laminae in member 60 have the glass fibers running parallel to the legs of the U-shaped structure and in others the glass fibers run transversely of the legs of the U-shaped structure.

The U-shaped member 63 is provided with an aperture 62 that registers with the aperture 44 when the U-shaped member is placed in position. After the U-shaped member has been placed in position, and the cover members 50 and 52 have been cut to the proper size and the margins 50c, 50d, 50e, 52c, 52d and 52e have been folded at right angles to the main body of the cover members 50 and 52, respectively, the parts are ready to be assembled.

The assembling may take place on a table or a flat bed. First, a sheet of plastic material 64 as, for example, a sheet of polyvinyl, is placed on the table top. This piece of polyvinyl sheet is larger than the size of the core member 10. Next, a sheet of stainless steel 66, or any other suitable sheet material, is placed on the polyvinyl sheet. The size of the sheet steel 66 is slightly greater than the size of the core member 10 plus the thickness of the cover members 50 and 52. The sheet steel or plate 66 is laid on the center of the polyvinyl sheet 64. The laminated sheet 52 is then superimposed on top of the steel sheet 66 between score lines 52a and 52b, aligned with the margins of the sheet steel 66. The core member 10, together with the U-shaped member 60, is then laid on top of the sheet 52 with the margins of the core member 10 registering with the score lines 52a and 52b. After core member 10 has been placed upon the sheet 52, the margins 52c are folded against the sides, the end margin 52d is folded against the U-shaped member 60 and the margin 52e is folded against the end of the core member 10. The laminated sheet 50 is placed on top of the core member 10, the margins 50c, 50d, and 50e being lapped over the margins 52c, 52d, and 52e. A sheet steel 70 is placed on top of cover member 50. This sheet steel 70 is provided with a threaded aperture 72 registering with the apertures 62 and 44 and with an aperture 74 in cover member 50.

Strips of steel 76 and 78 are placed on the sides so as to cover the margins 50c. Members 76 and 78 are slightly narrower than the thickness of the entire assembly. These members taper from one end to the other. A pair of end members or strips 80 and 82 slightly narrower than the ends of the assembly and slightly shorter than the ends of the assembly are placed against the margins or flaps 50d and 50e. The sheets 66 and 70, the strips 76, 78, 80, and 82 cooperate to form a mold assembly.

In order to supply pressure to the mold assembly, the entire assembly is placed in the bag and the air exhausted from the bag, thereby utilizing the atmospheric pressure to supply the necessary pressure to the plastic material. This has been accomplished by folding the margins of the plastic sheet 64 and the ends thereof over the sides of the assembly, sealing the margins of the plastic sheet 64 to the top sheet 70 by means of suitable adhesive strips 90.

A threaded nipple 92 shown in Figure 7, connected to a hose 94 extending to a vacuum pump (not shown) is used in withdrawing the air from the bag between plastic sheet 64 and the top sheet 70. By this arrangement, the air is removed from the interior of the assembly in that the aperture 46 registers with the hole 46 and the aperture 46 extends into each of the saw-cut grooves 32 so that a vacuum is drawn between each of the spars forming the core member. A vacuum is formed along the inside of flaps 52c, so that the air pressure exerts pressure on the top sheet 70, on the bottom sheet 66, on the two side pieces 70 and 78, and on the end members 80 and 82, so as to compress the mold inwardly in all directions. The mold assembly and its contents are subjected to a vacuum pressure for a sufficient period to withdraw the air or reduce vacuum pressure sufficiently so as to create the necessary atmospheric pressure on the exterior of the mold.

After the desired vacuum has been obtained within the bag, the bag and its contents are placed in a heated oven 100, this bag and its assembly 102 being located on a bed 104 and necessary heat applied to polymerize the plastic molding material used on the laminated assembly. In order to accomplish this result, the assembly is preferably heated to a temperature of 250° for a period of one hour. The time it takes to cure or polymerize a plastic material and the temperature used depends upon the thickness of the laminations, the type of plastic used, and other factors well known to those skilled in the art.

The molded diving board assembly, after the plastic has been polymerized, is removed from the oven, or kiln, 100. Upon removal of the bag and the sheet metal plates 66 and 70 and the strips 76, 78, 80, and 82 from the assembly, the diving board has flashes 110 that may be removed by grinding or in any other suitable manner.

The finished surface is smooth, glossy and slippery. That being the case, the top surface is provided with a coating 120 that contains an abrasive material similar to emery, such as aluminum oxide. This coating is applied by first covering the top and the front end of the board with an epoxy coating to which is applied aluminum oxide. Then another coating of epoxy is applied to cover this coating of aluminum oxide, which functions as a grit. The second epoxy coating anchors to the first coating. Thus, the second coating, in effect, surrounds the grit with resin, which thins out over the sharp corners of the grit or aluminum oxide.

In addition to the aperture 74 in the cover member 50, a hole 75 is formed in the cover 50 and similar holes in the bottom cover member 52, which holes register with the holes 42 and 44. The diving board is anchored upon a suitable support by passing bolts (not shown) through the brass bushings in these holes.

Although dimensions have been given as to the width and length of the board, these dimensions have been given only for the purpose of illustration. Furthermore, the number of laminae in each lamination depends in part upon the use of the board. If, for example, a shorter board is used, a lesser number of laminations may be used.

Although the board has been described as a diving board, the same type of board may be used for various other purposes, as for example, flooring, sheeting, roofing material and numerous other purposes. Furthermore, the device described herein could be used where a resilient board is required, such as amusement devices.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A board including a core member of fibrous material enclosed in a plastic cover, said plastic cover having glass fibers extending parallel to each other and from one end of the board to the other end thereof, said core member including a plurality of longitudinally extending spars having grooves in the lateral margins of the spars, the grooves of adjacent spars registering with each other so as to extend from one end of the core member to the other end thereof.

2. A board including a core member of fibrous material enclosed in a plastic cover, said plastic cover having glass fibers extending parallel to each other and from one end of the board to the other end thereof, said core member tapering from one end to the other, the thick end of the core member being provided with transversely disposed notches and a U-shaped plastic member reinforced with glass fibers being positioned in the notches and overlapping the end of the core member, the molded thickness of the U-shaped member being substantially equal to the depth of the notches.

3. A board including a core member of fibrous material enclosed in a plastic cover, said plastic cover having glass fibers extending parallel to each other and from one end of the board to the other end thereof, said core member consisting of a plurality of longitudinally extending spars tapering from one end to the other, the spars being provided with longitudinally extending grooves, said grooves extending from one end of the core member to the other, said spars having a transversely disposed passage and a passage extending normally to the transversely disposed passage.

4. The process of forming a diving board including the steps of forming a plurality of spars of fibrous material; forming grooves in the sides of the spars, the spars forming the core of the diving board; cementing the spars together with the grooves of adjacent spars in registry so as to form the core of the diving board; forming a passage transversely through the board; said passage registering with the grooves; forming a hole through the board near one end thereof, said hole intersecting the transverse passage; applying partially polymerized plastic covering members to the top and bottom, sides and ends of the core; forming a hole in one of the plastic covering members registering with the hole formed near the end of the board; enclosing the assembly of the core and the plastic covering members in an air-tight bag; exhausting the air from the bag, the hole, the transverse passage and the grooves forming passages for withdrawing air throughout the entire periphery of the board so as to cause the ambient air pressure to press the covering members into intimate contact with the board; and heating the assembly to complete the polymerization of the plastic covering members.

5. A process according to claim 4, wherein the fibrous material is severed so as to form tapering spars, said spars tapering from one end to the other.

6. A process according to claim 4, including the step of coating the core of the diving board with sodium silicate penetrating the exposed surfaces of the spars, but of such a viscosity and solids content to penetrate yet leave openings for air transmission.

7. A process according to claim 4, including the steps of notching one end of the core of the diving board; and mounting a U-shaped member of plastic material over the notched end of the core member, the legs of the U-shaped member filling the notches.

8. A process according to claim 4, including the steps of coating the core of the diving board with sodium silicate, said sodium silicate penetrating the exposed surfaces of the spars; notching one end of the core member; applying a plastic coating material over the core member; inserting a U-shaped plastic member over the notched end; the plastic coating securing the U-shaped member to the core member and the cover members to the core member when the assembly is heated to complete the polymerization of the plastic materials.

9. A process according to claim 4, including the steps of placing sheet metal members on the top, bottom, sides and ends of the plastic covering members, said sheet metal members functioning as molds during the molding operation, the top sheet metal member cooperating with a sheet of plastic material having the margins thereof sealed to form the bag.

References Cited in the file of this patent

UNITED STATES PATENTS

| | | |
|---|---|---|
| 71,210 | Pelletier | Nov. 19, 1867 |
| 1,606,051 | Bartlett | Nov. 9, 1926 |
| 1,626,117 | Munroe | Apr. 26, 1927 |
| 1,635,204 | Brown | July 12, 1927 |
| 2,193,067 | Hoppes | Mar. 12, 1940 |
| 2,344,488 | Bowling | Mar. 21, 1944 |
| 2,347,697 | Levey | May 2, 1944 |
| 2,373,500 | Pearce | Apr. 10, 1945 |
| 2,378,244 | Pfenning | June 12, 1945 |
| 2,423,647 | Gurvitch | July 8, 1947 |
| 2,428,325 | Collins | Sept. 30, 1947 |
| 2,441,169 | Roman | May 11, 1948 |
| 2,470,227 | Wheeler | May 17, 1949 |
| 2,569,831 | Ryall | Oct. 2, 1951 |
| 2,594,459 | Larson | Apr. 29, 1952 |
| 2,663,661 | Gramelspacher | Dec. 22, 1953 |
| 2,695,178 | Rheinfrank | Nov. 23, 1954 |
| 2,725,910 | Kahr | Dec. 6, 1955 |
| 2,747,871 | Brandt et al. | May 29, 1956 |
| 2,831,688 | Knox | Apr. 22, 1958 |

FOREIGN PATENTS

| | | |
|---|---|---|
| 362,925 | Great Britain | Nov. 30, 1931 |
| 627,255 | Great Britain | Aug. 4, 1949 |